United States Patent
Cho et al.

Patent Number: 6,114,689
Date of Patent: Sep. 5, 2000

[54] OPTICAL PICKUP DEVICE

[75] Inventors: Kun-ho Cho, Suwon; Jang-hoon Yoo, Seoul; Yong-hoon Lee, Suwon; Chul-woo Lee; Chong-sam Chung, both of Sungnam, all of Rep. of Korea

[73] Assignee: Samsung Electronics Co., Ltd., Suwon, Rep. of Korea

[21] Appl. No.: 09/299,664

[22] Filed: Apr. 27, 1999

[30] Foreign Application Priority Data

Apr. 27, 1998 [KR] Rep. of Korea ............ 98-14990

[51] Int. Cl.$^7$ ................ G02B 3/00; G11B 7/12
[52] U.S. Cl. ................ 250/216; 359/565; 369/112
[58] Field of Search ................ 250/216, 201.5; 359/15, 16, 19, 566, 569, 571, 575, 565; 369/44, 23, 1, 2

[56] References Cited

U.S. PATENT DOCUMENTS

| | | | |
|---|---|---|---|
| 5,125,750 | 6/1992 | Corle et al. | 359/819 |
| 5,422,870 | 6/1995 | Kojima et al. | 369/44.12 |
| 5,883,872 | 3/1999 | Kino | 369/112 |
| 5,917,788 | 6/1999 | Mowry | 369/44.23 |
| 5,930,434 | 7/1999 | Mowry | 385/124 |
| 5,946,281 | 8/1999 | Ito et al. | 369/112 |
| 5,978,139 | 11/1999 | Hatakoshi et al. | 359/565 |

FOREIGN PATENT DOCUMENTS

| | | |
|---|---|---|
| 0 814 468 | 12/1997 | European Pat. Off. |
| 59-140651 | 8/1984 | Japan |
| 60-182526 | 9/1985 | Japan |
| 61-106901 | 7/1986 | Japan |
| 61-118121 | 7/1986 | Japan |
| 63-47302 | 3/1988 | Japan |
| 5-47017 | 2/1993 | Japan |
| 6-242373 | 9/1994 | Japan |
| 8-315404 | 11/1996 | Japan |
| 9-258010 | 10/1997 | Japan |
| 11-68147 | 3/1999 | Japan |
| WO 98/09284 | 3/1998 | WIPO |
| WO 98/58370 | 12/1998 | WIPO |

OTHER PUBLICATIONS

Bass (Editor in Chief): "Handbook of Optics, vol. 2 (Devices, Measurement & Properties)" 1995, McGraw–Hill, New York, USA p. 7.18, paragraph 7.9 and p. 7.21, figure 22.

*Primary Examiner*—John R Lee
*Attorney, Agent, or Firm*—Staas & Halsey LLP

[57] ABSTRACT

An optical pickup device includes a light module, emitting light and receiving light reflected from a recording medium, and a solid immersion lens (SIL) member disposed in an optical path between the light module and the recording medium. The SIL has a planar surface facing the recording medium and a plurality of elliptically curved surfaces opposite the recording medium. The elliptically curved surfaces have different radii of curvature arranged symmetrical with respect to a central axis for focusing the incident light to form a tight beam spot on a recording plane of the recording medium.

20 Claims, 6 Drawing Sheets

OPTICAL PICKUP DEVICE

CROSS-REFERENCE TO RELATED APPLICATIONS

This application claims the benefit of Korean Application No. 98-14990, filed on Apr. 27, 1998, in the Korean Patent Office, the disclosure of which is incorporated herein by reference.

BACKGROUND OF THE INVENTION

The present invention relates to an optical pickup device, and more particularly, to an optical pickup device which can record/reproduce information, at high density, employing a solid immersion lens (SIL).

FIG. 1 is a diagram of a conventional optical pickup device for recording/reproducing information at high density. Light emitted from a light module 1 is reflected onto a SIL 10 by a reflection member 5. The SIL 10 focuses the light to form a beam spot on a recording plane of a disk 19. The light module 1 includes a light source, a device for converting a traveling path of incident light and a photodetector for receiving the light reflected from the recording plane of the disk 19. The reflection member 5 performs minute tracking by making fine changes to the incidence angle of incident light by moving the position of the beam spot formed on the disk 19 little by little. The SIL 10 is supported by a slider 15 separated several tens of nanometers from the disk 19 by an air bearing effect when the disk 19 rotates. An incident surface 10a of the SIL 10 is curved to focus incident light. The opposite surface 10b of the SIL 10, facing the disk 19, is planar.

The size of a beam spot formed on a disk can be substantially represented as:

$$\frac{\lambda}{2NA}$$

A where $\lambda$ is the wavelength of light emitted from a light source and NA is the numerical aperture of the light focusing device. Thus, to reduce the size of a beam spot to enable higher density recording/reproduction, the wavelength of the light must be reduced or the numerical aperture must be increased. However, the maximum numerical aperture theoretically available in air is approximately 1.

Since the surface 10b of the SIL 10 is very close to the disk 19, when the refractive index of the SIL 10 is $n_{SIL}$, the wavelength of light in the SIL 10 and the disk 19 equals $$\frac{\lambda}{n_{SIL}}.$$

When compared to, $$\frac{\lambda}{2NA},$$

the numerical aperture of the SIL 10, with respect to the wavelength of light emitted from a light source, i.e., $\lambda$, is greater than or equal to 1, thereby reducing the size of the beam spot. Here, the SIL 10 has a refractive index which is substantially the same as that of a protective film for protecting the recording plane of the disk 19. Since the distance between the SIL 10 and the disk 19 is in the range of several tens of nanometers, the beam spot is not exposed to the air and thus the numerical aperture is greater than or equal to 1, thereby reducing the size of the beam spot.

FIG. 2 is a detailed diagram of the SIL 10 shown in FIG. 1. The SIL 10, having one curved surface cannot remove both spherical aberration and coma aberration. On the other hand, if the incident surface 10a of the SIL 10 is elliptically curved, as shown in FIG. 2, the spherical aberration can be removed. However, the elliptically curved surface 10a does not satisfy Abbe's sine condition and becomes very sensitive to the tilt of incident light. Thus, coma aberration is generated in the light S1 (which is incident obliquely) and is focused by the SIL 10, as shown in FIGS. 2 and 3. If the incident surface 10a of the SIL 10 was curved hemispherically, the coma aberration is removed but defocusing and spherical aberration still exist. Since an optical recording/reproducing apparatus employing the SIL 10 is very sensitive to tilt, which generates coma aberration, it is very difficult to fabricate.

FIG. 4 is a diagram of a proposed optical pickup device. The proposed optical pickup device has a focusing objective lens 7 installed between the light module 1 and the SIL 10. In this case, spherical aberration and coma aberration are removed by the objective lens 7 and the SIL 10 serves to increase the numerical aperture. However, since the proposed optical pickup device employs two lenses, that is, the objective lens 7 and the SIL 10, the system is complex, bulky and costly.

SUMMARY OF THE INVENTION

It is an objective of the present invention to provide an optical pickup device which is not sensitive to tilt of incident light and has a high numerical aperture so as to be capable of high-density recording/reproduction, while employing a single lens so as to be simple and compact.

To achieve these and other objectives, there is provided an optical pickup device including a light module for emitting light and receiving light reflected from a recording medium, and a solid immersion lens (SIL) member disposed in an optical path between the light module and the recording medium, and having a planar surface facing the recording medium and a plurality of elliptically curved surfaces having different radii of curvature so as to be symmetrical with respect to a central axis on its incident surface to which the light is incident from the light module, for focusing the incident light to form a beam spot on a recording plane of the recording medium. The radius of curvature of an ellipse positioned farther than the central axis is larger than that of an ellipse positioned nearer than the central axis.

BRIEF DESCRIPTION OF THE DRAWINGS

The objectives and advantages of the present invention will become more apparent by describing in detail a preferred embodiment thereof with reference to the attached drawings briefly described hereinafter.

DESCRIPTION OF THE PREFERRED EMBODIMENTS

Figure 5:
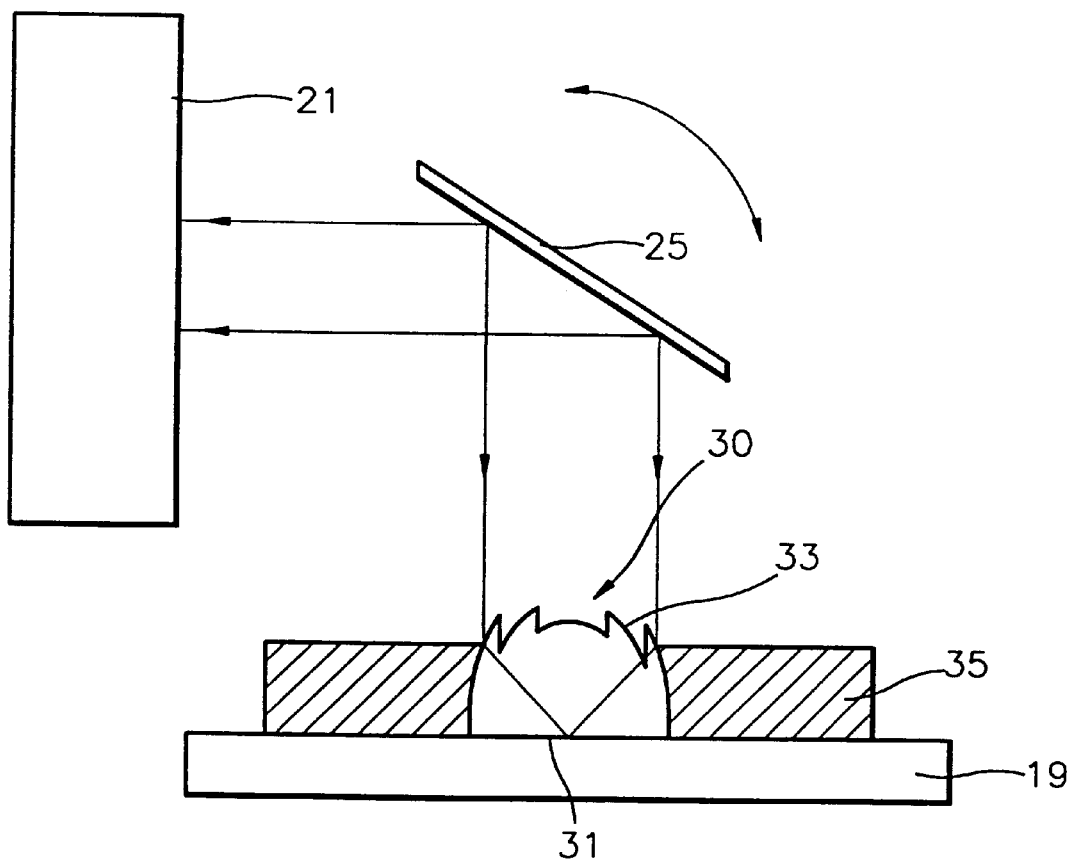
FIG. 5 is a diagram of an optical pickup device capable of high-density recording/reproduction according to a first preferred embodiment of the present invention.

FIG. 5 is a diagram of an optical pickup device capable of high-density recording/reproduction according to a first preferred embodiment of the present invention. The optical pickup device includes a light module 21 for emitting light and receiving light reflected from a recording medium 19 and a solid immersion lens (SIL) member 30 disposed on an optical path between the light module 21 and the recording medium 19.

The light module 21 can be a conventional light module, such that it includes a light source (not shown), a device (not shown) for converting the traveling path of incident light, and a photodetector (not shown) for receiving light reflected from the recording medium 19. The device for converting may be a beam splitter or a hologram device.

The SIL member 30 focuses incident light and forms a beam spot on the recording plane of the recording medium 19. An incident surface 33 of the SIL member 30 is curved for focusing incident light from the light module 21 so as to land on the recording plane of the recording medium 19. A surface 31, of the SIL member 30 facing the recording medium 19, is planar.

Figure 6:
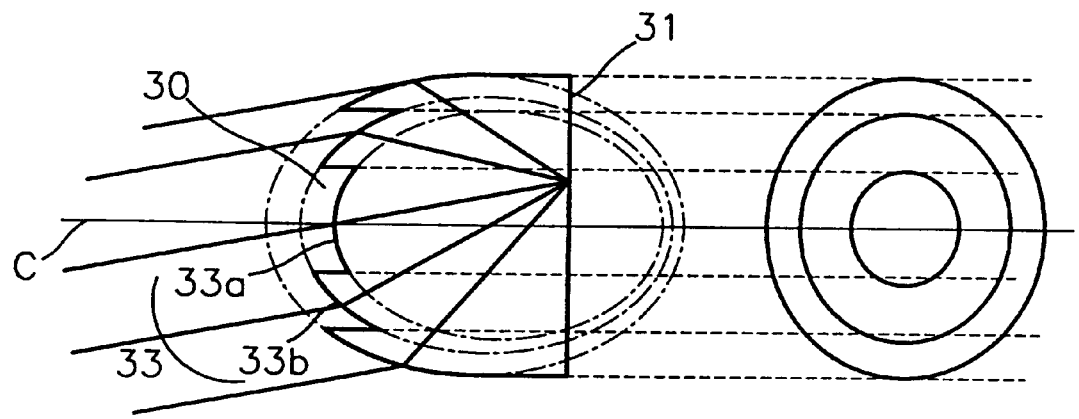
FIG. 6 is a diagram of a solid immersion lens (SIL) employed in the optical pickup device shown in FIG. 5.

FIG. 6 is a diagram of a solid immersion lens (SIL) 30 employed in the optical pickup device shown in FIG. 5. The incident surface 33, as shown in FIG. 6, has a plurality of elliptically curved surfaces 33a and 33b having different radii of curvature so as to be symmetrical with respect to a central axis (c). Preferably, the radii of curvature of the elliptically curved surfaces 33a and 33b become larger on the surfaces further away from the central axis (c).

Figure 7:
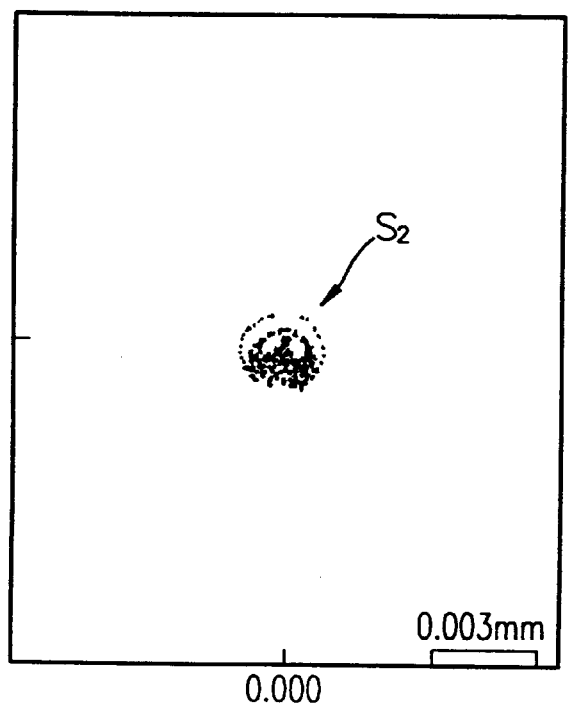
FIG. 7 is a diagram of a beam spot focused by the SIL employed in the optical pickup device shown in FIG. 5.

FIG. 7 is a diagram of a beam spot focused by the SIL employed in the optical pickup device shown in FIG. 5. The SIL member 30 having the elliptically curved surface 33a and 33b as described above generates little spherical aberration and offsets coma aberration due to a tilt of incident light. Therefore, the light which is incident obliquely with respect to the SIL member 30 is focused to form a tight beam spot S2.

Referring once again to FIG. 5, the SIL member 30 is supported by a slider 35. The SIL member 30 and the slider 35 are lifted slightly from the recording medium 19 by an air bearing effect when the disk-shaped recording medium 19 rotates. The SIL member 30 has substantially the same refractive index as that of a protective film for protecting the recording plane of the recording medium 19. The principle of increasing the numerical aperture employing the SIL member 30 has been described above with reference to FIG. 1 such that an explanation thereof will be omitted.

Preferably, a reflection member 25 for adjusting a tilt of incident light is provided on an optical path between the light module 21 and the SIL member 30. An incidence angle of light incident onto the SIL member 30 can be minutely changed by rotating the reflection member 25. Thus, minute tracking can be performed by changing the position of the beam spot formed on the recording medium 19.

Figure 1:
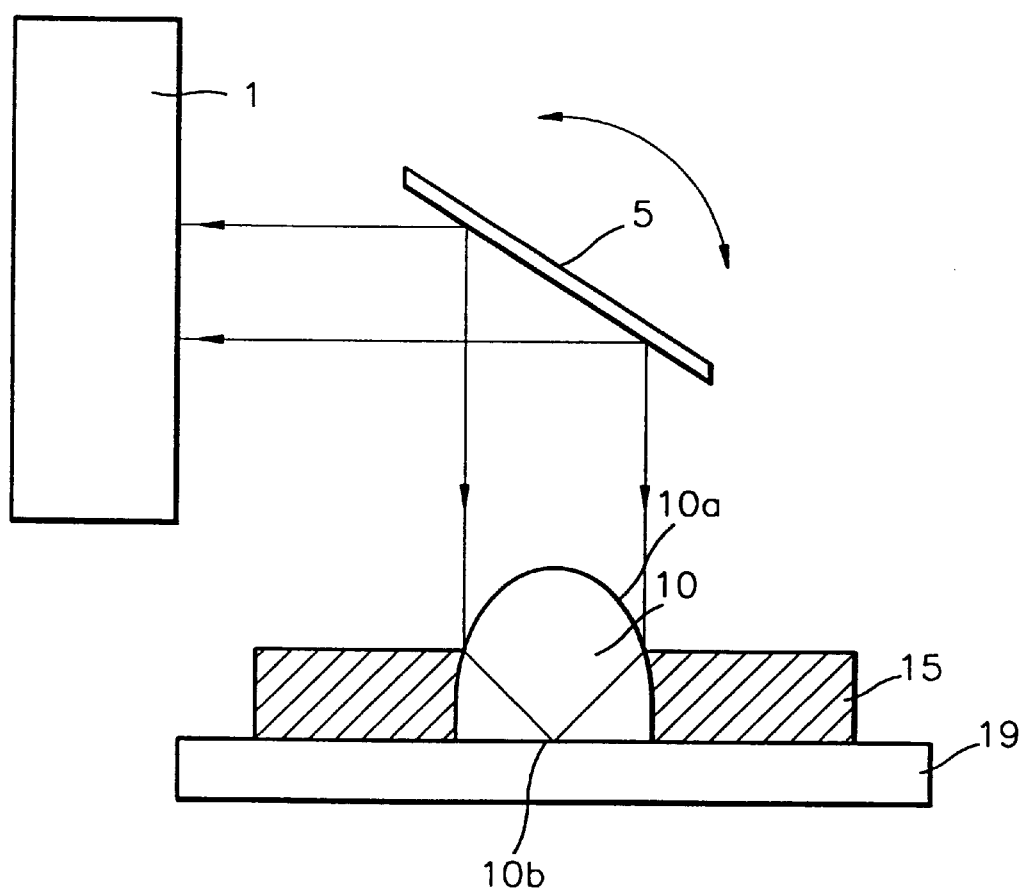
FIG. 1 is a diagram of a conventional optical pickup device capable of high-density recording/reproduction.
Figure 2:
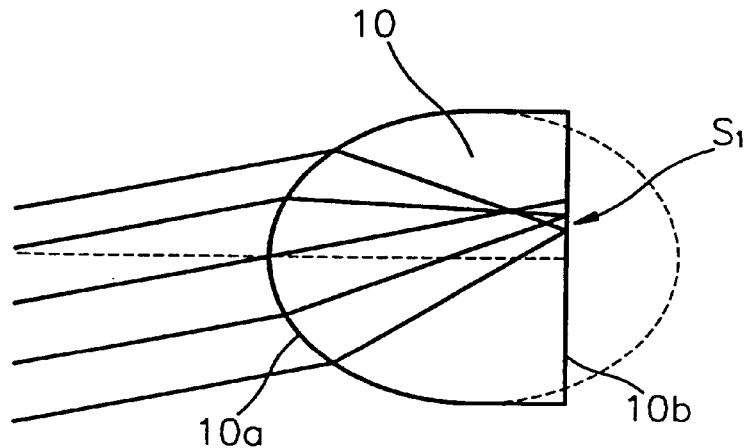
FIG. 2 is a diagram of a solid immersion lens (SIL) employed in the optical pickup device shown in FIG. 1.
Figure 3:
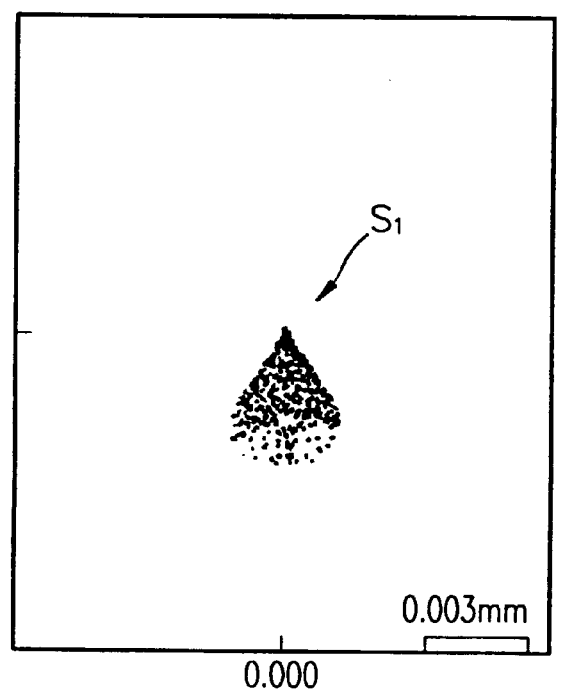
FIG. 3 is a diagram of a beam spot as focused by the SIL employed in the optical pickup device shown in FIG. 1.
Figure 4:
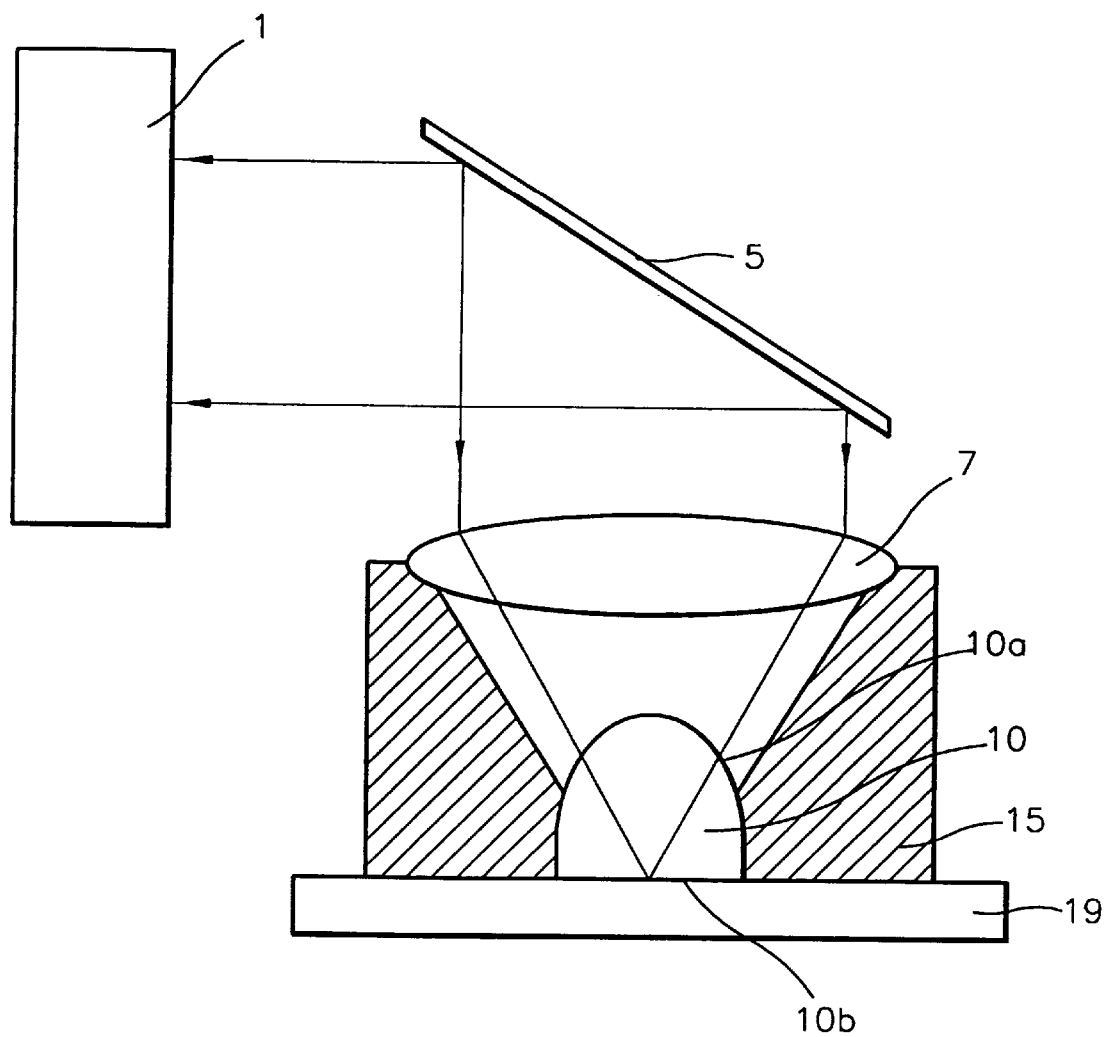
FIG. 4 is a diagram of a proposed conventional optical pickup device capable of high-density recording/reproduction.

According to the present invention, using the SIL member 30 having a plurality of elliptically curved surfaces, coma aberration can be suppressed by about a third when compared to the optical pickup device employing a conventional SIL 10 (shown in FIG. 1).

Figure 8:
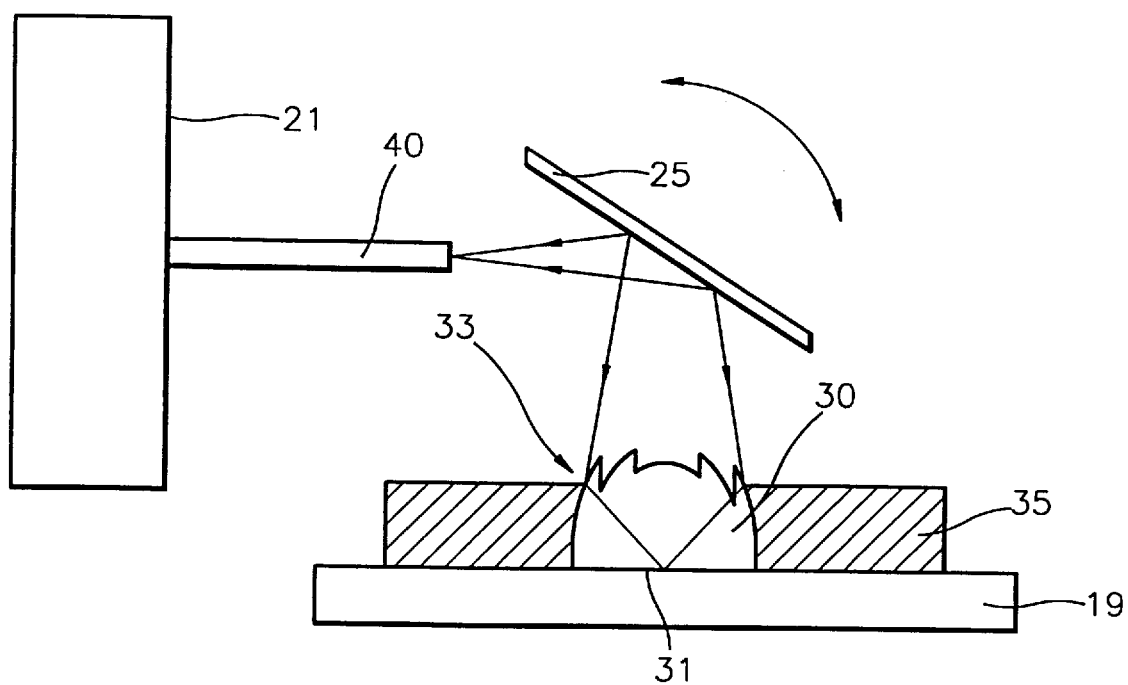
FIG. 8 is a diagram of an optical pickup device capable of high-density recording/reproduction according to a second embodiment of the present invention.

FIG. 8 is a diagram of an optical pickup device capable of high-density recording/reproduction according to a second embodiment of the present invention. The optical pickup device according to the second embodiment of the present invention further includes an optical fiber 40 installed on an optical path between the light module 21 and the SIL member 30. The optical fiber 40 is a channel transmitting light from the light module 21 to the SIL member 30 and from the SIL member 30 to the light module 21. By providing the optical fiber 40, fabrication of an optical recording/reproducing apparatus is facilitated and the minute tracking area can be widened.

Since the optical pickup device according to the present invention employs a single SIL member 30 having a plurality of elliptically curved surfaces 33a and 33b, the overall device is simplified and compact. Also, the optical pickup device is considerably less affected by coma aberration so that it is not sensitive to a tilt of incident light while the minute tracking area is increased. Also, since the numeral aperture is greater than or equal to 1, the size of a beam spot can be reduced, thereby enabling high-density recording/reproduction of an information signal.

What is claimed is:

1. An optical pickup device comprising:
    a light module which emits light toward and receives light reflected from a recording medium; and
    a solid immersion lens member, disposed on an optical path between the light module and the recording medium, having a planar surface facing the recording medium and an incident surface with a plurality of elliptically curved surfaces, each with a different radius of curvature, symmetrically arranged with respect to a central axis of the solid immersion lens member, the solid immersion lens member focusing the incident light to form a beam spot on a recording plane of the recording medium.

2. The optical pickup device as claimed in claim 1, wherein the radius of curvature of the plurality elliptically curved surfaces increases for elliptically curved surfaces further from the central axis.

3. The optical pickup device as claimed in claim 1, further comprising a reflection member, positioned on the optical path between the light module and the solid immersion lens member, so as to adjust a tilt of incident light.

4. The optical pickup device as claimed in claim 1, further comprising an optical fiber, positioned on the optical path between the light module and the solid immersion lens member, transmitting light between the light module and the solid immersion lens member.

5. An optical pickup device comprising:
    a light emitter; and
    a solid immersion lens which receives the light emitted by the emission means on a plurality of concentric elliptically curved surfaces and focuses the light on to an optical medium, each curved surface symmetrically arranged with respect to a central axis of the solid immersion lens.

6. The optical pickup device as claimed in claim 5, wherein each of the plurality of concentric elliptically curved surfaces has a different radius of curvature.

7. The optical pickup device as claimed in claim 5, wherein each of the radii of curvature of each of the plurality of concentric elliptically curved surfaces increases with the distance of the elliptically curved surface from the central axis of the solid immersion lens.

8. A method of reading information from an optical medium comprising:

emitting light;

directing the light toward the optical medium;

focusing the light onto the optical medium using a solid immersion lens having a plurality of elliptically curved surfaces and a central axis, each elliptically curved surface being elliptically curved in a plane which includes the central axis; and converting the light reflected from the optical medium into an electrical signal.

9. A method of reading information from an optical medium comprising:

emitting light;

directing the light toward the optical medium;

focusing the light onto the optical medium using a solid immersion lens having a plurality of concentric elliptically curved surfaces, each curved surface symmetrically arranged with respect to a central axis of the solid immersion lens member; and converting the light reflected from the optical medium into an electrical signal.

10. The method of reading information from an optical medium as claimed in claim 9, further comprising:

passing the emitted light through an optical fiber.

11. The method of reading information from an optical medium as claimed in claim 10, further comprising:

passing the reflected light through an optical fiber.

12. An optical pickup device comprising:

a light module which emits light toward and receives light reflected from a recording medium; and a solid immersion lens member disposed on an optical path between the light module and the recording medium, the lens member having a planar surface facing the recording medium, a central axis, and an incident surface comprising a plurality of elliptically curved surfaces opposite the planar surface, each of said plurality of elliptically curved surface being elliptically curved in a plane which includes the central axis, the lens member focusing the incident light to form a beam spot on a recording plane of the recording medium.

13. The optical pickup device as claimed in claim 12, wherein each of the plurality of the elliptically curved surfaces is symmetrically arranged with respect to the central axis of the solid immersion lens member.

14. The optical pickup device as claimed in claim 12, wherein each elliptically curved surface has a different radius of curvature.

15. The optical pickup device as claimed in claim 14, wherein the radius of curvature of each elliptically curved surface increases for elliptically curved surfaces further from the central axis.

16. The optical pickup device as claimed in claim 12, further comprising a reflection member, positioned on the optical path between the light module and the solid immersion lens member, so as to adjust a tilt of incident light.

17. The optical pickup device as claimed in claim 12, further comprising an optical fiber, positioned on the optical path between the light module and the solid immersion lens member, transmitting light between the light module and the solid immersion lens member.

18. An optical pickup device comprising:

a light emitter to emit light; and a solid immersion lens having a central axis which lens receives the light emitted by the light emitter on a plurality of elliptically curved surfaces and focuses the light onto an optical medium, each said curved surface being elliptically curved in a plane which includes the central axis.

19. The optical pickup device as claimed in claim 18, wherein each of the plurality of elliptically curved surfaces has a different radius of curvature.

20. The optical pickup device as claimed in claim 19, wherein a radius of curvature of each of the plurality of elliptically curved surfaces increases with the distance of the elliptically curved surface from the central axis of the solid immersion lens.

* * * * *